March 29, 1966 LA VERN R. TIETZ 3,243,045
FILTER
Original Filed March 28, 1960 2 Sheets-Sheet 1
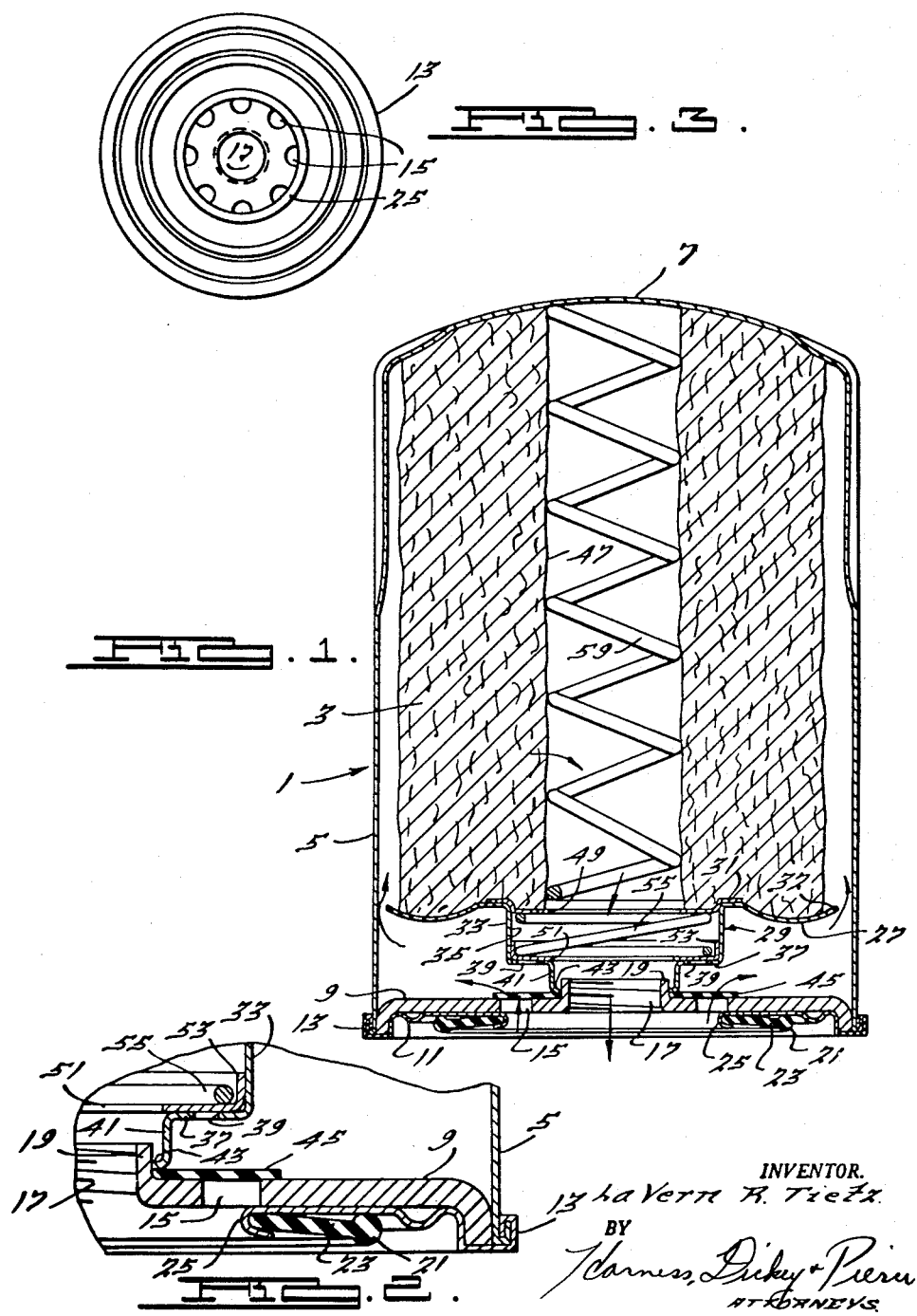
INVENTOR.
La Vern R. Tietz
BY
Harness, Dickey & Pierce
ATTORNEYS March 29, 1966  LA VERN R. TIETZ  3,243,045
FILTER
Original Filed March 28, 1960  2 Sheets-Sheet 2
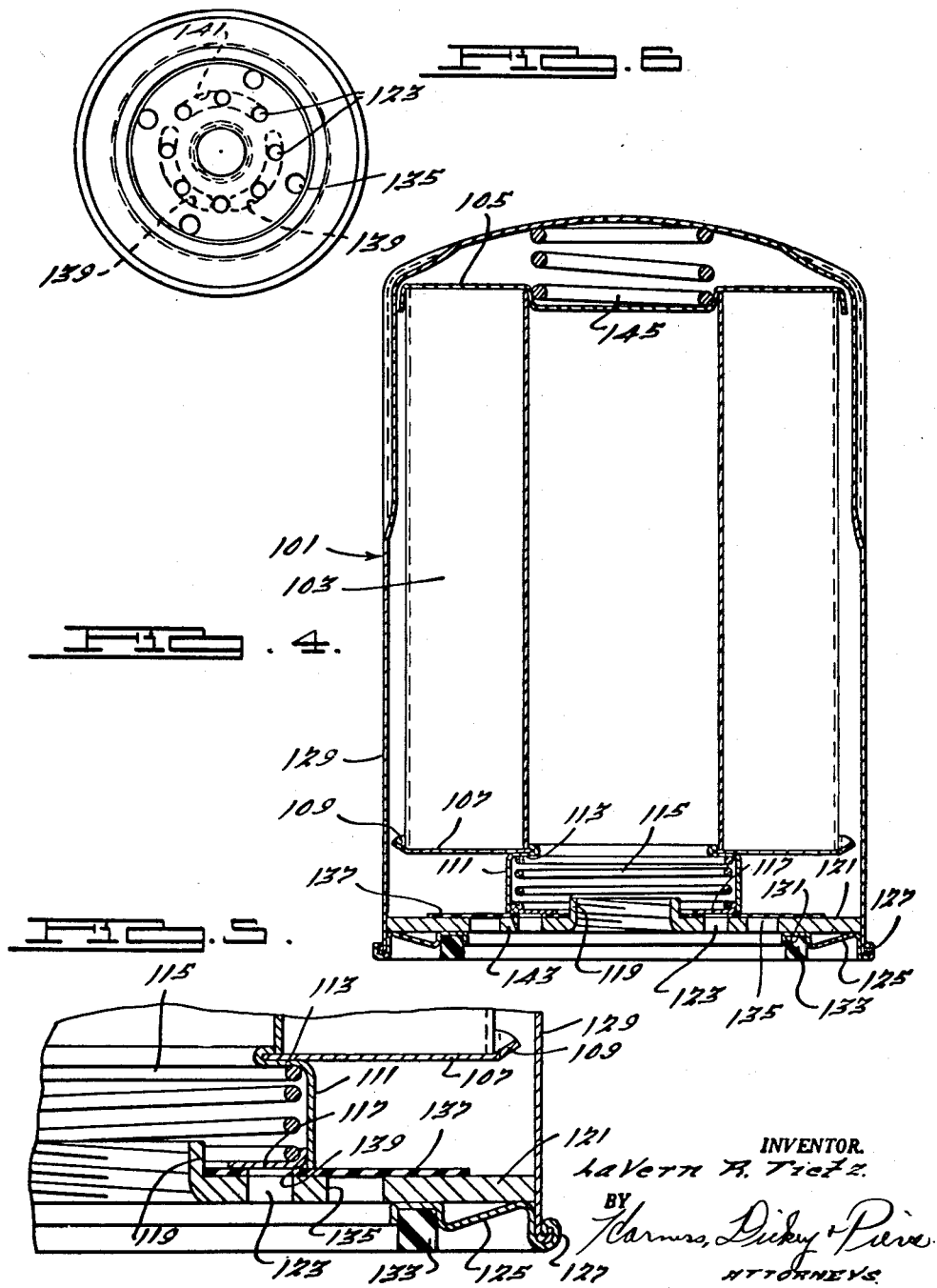
INVENTOR.
La Vern R. Tietz.
BY
Harness, Dickey & Pierce
ATTORNEYS

United States Patent Office 3,243,045
Patented Mar. 29, 1966

3,243,045
FILTER
La Vern R. Tietz, Plymouth, Mich., assignor to Walker Manufacturing Company, a corporation of Delaware
Original application Mar. 28, 1960, Ser. No. 18,115, now Patent No. 3,132,097, dated May 5, 1964. Divided and this application July 5, 1963, Ser. No. 292,963
2 Claims. (Cl. 210—130)

This application is a division of my copending application, Serial No. 18,115, filed March 28, 1960, and now U.S. Patent No. 3,132,097, granted May 5, 1964.

My invention relates to filters and, while not so limited, is particularly concerned with a disposable filter unit for use in the lubricating systems of internal combustion engines.

It is the object of my invention to provide a more compact and economical arrangement of relief and check valves for a filter unit.

In accordance with my invention both the check valve and the relief valve are provided at one end of the filter. In previous commercial units it has been common practice to separate these valves, the relief valve normally being located a considerable distance from the point at which fluid enters or leaves the filter. My arrangement makes possible certain economies in manufacture and approaches the maximum in compactness.

More features, objects, and advantages of the invention will become apparent upon consideration of the accompanying drawings in which:

FIGURE 1 is a vertical, longitudinal cross section through one embodiment of a disposable oil filter utilizing my invention;

FIG. 2 is an enlargement of a portion of the base structure of FIG. 1;

FIG. 3 is a reduced scale bottom view of the structure of FIG. 1;

FIG. 4 is a vertical, longitudinal cross section through another embodiment of the invention;

FIG. 5 is an enlargement of a portion of the base of FIG. 4; and

FIG. 6 is a reduced bottom view of the structure of FIG. 4.

Referring first to the throwaway oil filter unit 1 of FIGS. 1–3, there is a tubular filter body 3 preferably of compressible, fibrous material such as cotton, sisal, wood, or mixtures thereof, enclosed within but spaced radially from the sidewall of a casing 5 that has an integral wall to close the top end 7 but no integral wall at the bottom end. The bottom end is closed however, by a multi-purpose, relatively heavy, gauge plate 9, the plate being held in position by a thinner gasket holding plate 11 that is interlocked at 13 in a fluidtight joint with the bottom end of the casing 5. The plate 9 has a plurality of circumferentially spaced, smaller openings 15 and a threaded, larger central opening 17 formed in a neck 19. The openings 15 comprise the oil inlet and the opening 17, the oil outlet, though conceivably by suitable modifications these functions could be reversed if desired. The threads in opening 17 serve as a means for mounting the unit 1 on a standpipe (not shown). The bulb end 21 of gasket 23, which is held pinched by rebent flange 25 on plate 11, serves as a seal means to engage a flat surface (not shown) to provide an inlet chamber for oil to enter openings 15.

The top of the filter body 3 is held pressed tightly against top 7 of the casing to prevent by-passing. The bottom end of the body 3 is supported by a cupped flange 27 integral with spacer and separator 29 and by retainer plate 31 overlying flange 27, flange 27 extending beyond the body 3 in a lip 32. The spacer 29 has a tubular section 33 forming a valve chamber 35 and then a radial section 37 containing a plurality of circumferentially spaced by-pass openings 39. Further, the spacer 29 has a small diameter, tubular section 41 which terminates in a small radial flange 43 that fits around neck 19 and also holds the inner circumferential edge of an annular rubber valve 45 tightly against the inside top face of plate 9. The free, outer radial portion of rubber disc 45 acts as a flap-type check or anti-drainback valve that will lift to allow liquid to enter through openings 15 but will seal against plate 9 to prevent back flow through these openings. It is apparent that, when the unit 1 is operative to filter, liquid entering through openings 15 will flow up into the annular space surrounding body 3 and then will be filtered as it flows transversely through the body to the central passage 47 in it. From passage 47 it will flow down through opening 49 in plate 31 and through an opening 51 in a valve member 53 within chamber 35 to the outlet 17.

The valve member 53 is cup or pan-shaped and is slidable up and down on its sidewall which engages the tubular section 33 of spacer 29. The bottom face of valve 53 engages spacer section 37 and covers by-pass openings 39 being pressed against face 37 with a predetermined force supplied by coil spring 55 which is confined and compressed inside chamber 35 by retainer plate 31. The plate 31 may be spot welded to flange 27 or may be simply held against it by the axial forces on all the parts when assembled as illustrated. The coil spring 59 within passage 47 can be used if desired to engage plate 31 and react against spring 55 in addition to its function of providing internal support for the body 3.

In the event that the resistance to flow through body 3 exceeds the value determined by spring 55, fluid pressure on valve 53 will lift it from its seat 37 permitting fluid to by-pass directly from inlets 15 to the top of neck 19 and out through outlet 17 without coming in contact with any contaminated filter body surfaces.

The filter unit 101 of FIGS. 4–6 contains a filter element 103 which is illustrated in the form of a pleated paper structure adhered to top end cap 105 and a bottom end cap 107 having outer annular lip 109. Secured by crimping to an inner flange of the lower end cap 107 is the top end of a tubular spacer 111, the spacer having a top radial surface or shoulder 113 engaging the bottom of end plate 107 and forming a back-up surface for coil spring 115. This spring supplies closing force for the pan or cup-shaped valve 117 that is slidable inside of spacer 111. The valve is substantially larger in diameter than the neck 119 of heavy plate 121 but overlies a series of regularly circumferentially spaced by-pass holes 123 formed in plate 121.

The plate 121, unlike plate 9, is entirely flat. It abuts against gasket plate 125 that is interlocked at 127 in a fluid tight joint with the bottom end of casing 129. The inner portion of plate 125 is formed to provide an annular recess 131 that tightly receives and holds the upper side of a gasket ring 133 of rectangular, preferably square, cross section, the lower side being capable of deforming to provide an effective seal when the neck 119 is screwed on a standpipe to force gasket 133 against a seating surface (not shown).

The plate 121 also has a series of circumferentially spaced inlet holes 135 spaced outwardly of by-pass holes 123. The holes 135 are covered by a rubber disc type anti-drain back or check valve 137 which has an inner diameter that fits snugly around the outside of neck 119. The portion of valve 137 that overlies by-passing openings 123 has three kidney shaped slots 139 and 141 of the relative circumferential lengths revealed in FIG. 6 so that no matter what angular position is occupied by the disc 137 no more than one opening 123 will be covered by it and rendered inoperative for by-pass flow. The disc 137 is held in place by the bottom end of spacer 111 which is aligned with annular portion 143 of plate 121 between holes 123 and 135. A spring 145 between the top of casing 129 and imperforate top end plate 105 holds the entire assembly of parts tightly together against plate 121 and in turn against gasket plate 125.

In operation, oil to be filtered will enter openings 135 and raise rubber disc 137 above the bottom of spacer 111 as a fulcrum. It will flow up and transversely through the filter element and then down and out through the outlet neck 119. It cannot drain back through openings 135 because this tendency will force the disc 137 against the top of plate 121 to seal off the openings.

In the event that resistance to flow through the filter exceeds the setting of spring 115 oil will lift valve 117 and flow up through openings 123 in plate 121 and then through openings 139 and 141 in the disc 137 and around the inner periphery of valve 117, up and around the neck 119 and then out through it. Thus, a direct by-pass from the inlet reservoir beneath plate 121 to the outlet in neck 119 is provided with no flow by contaminated filter surfaces.

It will now be realized that the invention provides a filter unit of the throwaway type wherein the location of the relief or by-pass valve at the bottom, close to the inlet and outlet, provides a compact, economical, and efficient structure. Variations may be made in the specific structures illustrated without departing from the spirit and scope of the invention.

I claim:

1. In a filter element, a housing, a filter body in said housing, a plate closing one end of said housing and having a centrally located outlet opening, inlet means formed in said plate radially outwardly of said outlet opening, a check valve associated with said inlet means and mounted adjacent said plate for preventing back flow of fluid to said inlet means, a tubular member having a first diameter portion encircling said outlet opening and a larger diameter portion, one end of said larger diameter portion engaging said filter body and spacing said filter body from said plate and supporting said body upon said plate, said larger and said smaller diameter portions of said tubular member being integrally connected by a radially extending wall of said tubular member, one end of said smaller diameter portion engaging said check valve and urging the engaged portion into engagement with said plate for fixing said check valve in position with respect to said plate, aperture means in said radially extending wall for admitting fluid from said inlet means to the inside of said tubular member, a valve member caged inside of said larger diameter portion and adapted to sealingly engage said aperture means in said radially extending wall, and resilient means caged inside of said larger diameter portion and engaging said valve for controlling the opening pressure of said valve.

2. A filter element comprising a housing, a filter body supported in said housing, a plate closing one end of said housing, said plate having a centrally located outlet opening, inlet means in said plate positioned radially outwardly of said outlet opening, a check valve positioned adjacent said plate and adapted to cover sad inlet means to prevent back flow therethrough, a tubular member, one end of said tubular member engaging said check valve around said outlet opening for holding said check valve in position with respect to said plate, the other end of said tubular member engaging said filter body for spacing said filter body from said plate and supporting said body upon said plate, aperture means spaced radially from the axis of said outlet opening for admitting fluid to the inside of said tubular member for bypassing said filter body, a valve slidably caged inside of said tubular member and adapted to engage said aperture means for controlling the flow therethrough, and resilient means caged inside of said tubular member and engaging said valve for controlling the opening pressure of said valve.

References Cited by the Examiner

UNITED STATES PATENTS

| | | |
|---|---|---|
| 2,888,141 | 4/1959 | Coates et al. |
| 2,995,250 | 8/1961 | Boewe. |
| 3,000,506 | 9/1961 | Hultgren. |
| 3,036,711 | 5/1962 | Wilhelm. |

REUBEN FRIEDMAN, *Primary Examiner.*

F. W. MEDLEY, *Assistant Examiner.*